(12) United States Patent
Fu

(10) Patent No.: US 7,187,488 B2
(45) Date of Patent: Mar. 6, 2007

(54) TRIMMING A MEMS DEVICE TO FINE TUNE NATURAL FREQUENCY

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 0 days.

(21) Appl. No.: 11/077,099

(22) Filed: Mar. 9, 2005

(65) Prior Publication Data

US 2006/0203326 A1    Sep. 14, 2006

(51) Int. Cl.
*G02B 26/00* (2006.01)

(52) U.S. Cl. .................................. 359/290; 359/291

(58) Field of Classification Search ................ 359/290, 359/291, 292, 295, 298, 223, 224, 871, 872; 248/478
See application file for complete search history.

(56) References Cited

U.S. PATENT DOCUMENTS 6,912,078 B2 *   6/2005   Kudrle et al. ............... 359/224
7,034,370 B2 *   4/2006   Kuo ........................... 257/414
2004/0060898 A1 *  4/2004   Tsai ............................. 216/2

* cited by examiner

*Primary Examiner*—Ricky Mack
*Assistant Examiner*—M. Hasan
(74) *Attorney, Agent, or Firm*—Patent Law Group LLP; David C. Hsia

(57) ABSTRACT

A mirror device includes a mirror, an anchor, and a spring coupling the mirror to the anchor. The anchor and/or mirror can define one or more rows of holes adjacent to the coupling location of the spring. The natural frequency of the device can be adjusted by removing material between the perimeter of the mirror/anchor and the outermost holes, and between adjacent holes in the same row.

Another mirror device includes a mirror, anchors, and springs coupling the mirror to the anchors. The natural frequency of the device can be adjusted by decoupling one or more springs coupling the mirror to the anchors.

The mirror of both devices can includes one or more sacrificial portions. The natural frequencies of the both devices can also be adjusted by trimming the sacrificial portions.

17 Claims, 3 Drawing Sheets

TRIMMING A MEMS DEVICE TO FINE TUNE NATURAL FREQUENCY

FIELD OF INVENTION

This invention relates to scanning mirror devices, and more particularly to micro-electro-mechanical system (MEMS) scanning mirrors.

DESCRIPTION OF RELATED ART

Various electrostatic comb actuator designs for MEMS scanning mirrors have been proposed. The extensive applications of these devices include barcode readers, laser printers, confocal microscopes, projection displays, rear projection TVs, and wearable displays.

A MEMS scanning mirror is typically driven at its main natural frequency to achieve a high scanning angle. Invariably the manufacturing processes produce MEMS scanning mirrors with dimensional inconsistencies that vary the natural frequencies of the individual devices. If the main natural frequency of a MEMS scanning mirror is too low or too high, the device will not produce the proper scan speed and the proper scan angle under an alternating current (AC) drive voltage selected for a majority of the MEMS scanning mirrors.

Thus, an apparatus and a method are needed to tune the main natural frequency of the MEMS scanning mirrors to improve the manufacturing yield of these devices. Furthermore, such an apparatus and a method allow a single design of a scanning mirror to be modified to make various devices with different natural frequencies.

SUMMARY

In one embodiment of the invention, a mirror device includes a mirror, an anchor, and a spring coupling the mirror to the anchor. The anchor can define one or more rows of holes adjacent to the location where the anchor is coupled to the spring. Alternatively or in addition to the anchor defining one or more rows of holes, the mirror can define one or more rows of holes adjacent to the location where the mirror is coupled to the spring. The natural frequency of the device can be adjusted by removing material between the perimeter of the anchor/mirror and the outermost holes, and between adjacent holes in the same row.

The mirror can further include one or more sacrificial portions. The natural frequency of the device can also be adjusted by trimming the sacrificial portions.

In another embodiment of the invention, a MEMS mirror device includes a mirror, anchors, and springs coupling the mirror to the anchors. The natural frequency of the device can be adjusted by decoupling one or more springs coupling the mirror to the anchors.

The mirror can further include one or more sacrificial portions. The natural frequency of the device can also be adjusted by trimming the sacrificial portions.

BRIEF DESCRIPTION OF THE DRAWINGS

Use of the same reference numbers in different figures indicates similar or identical elements.

DETAILED DESCRIPTION OF THE INVENTION

Figure 1:
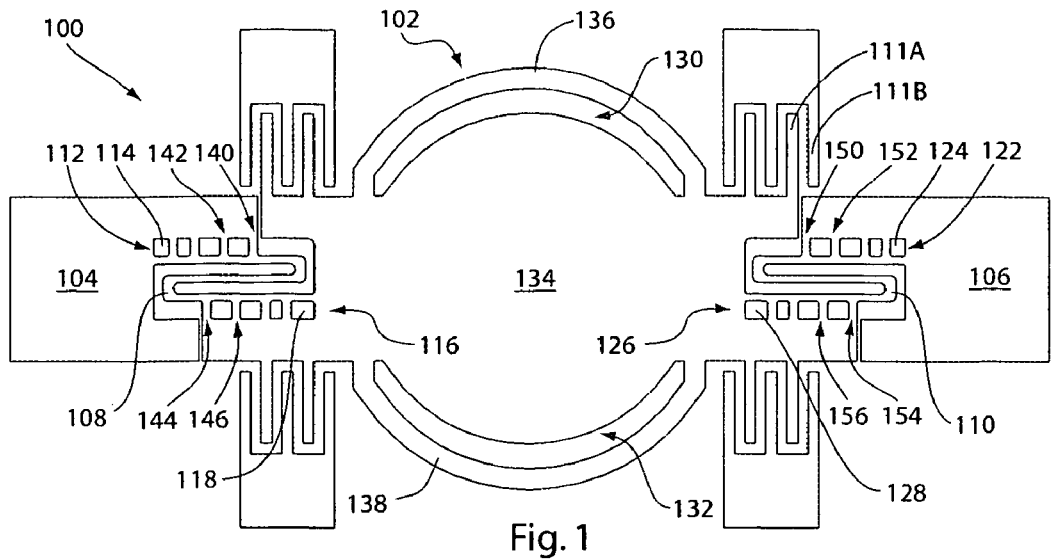
FIG. 1 illustrates a MEMS mirror prior to trimming in one embodiment of the invention.

FIG. 1 illustrates a micro-electro-mechanical system (MEMS) mirror device 100 in one embodiment of the invention. Device 100 includes a mirror 102, anchors 104 and 106, a serpentine spring 108 coupling mirror 102 to anchor 104, and a serpentine spring 110 coupling mirror 102 to anchor 106. Typically anchors 104 and 106 suspend mirror 102 to allow mirror 102 to rotate along the rotational axis of springs 108 and 110. Mirror 102 can include rotational fingers 111A that are interdigitated with in-plane or out-of-plane stationary fingers 111B. Rotational fingers 111A and stationary fingers 111B can be driven in a variety of fashion to oscillate mirror 102.

On the left side of device 100, anchor 104 has a row 112 of holes 114 (only one is labeled for clarity) located adjacent to the attachment location of anchor 104 to spring 108. Row 112 is parallel to the rotational axis of spring 108. Mirror 102 also has a row 116 of holes 118 (only one is labeled for clarity) located adjacent to the attachment location of mirror 102 to spring 108. Row 116 is also parallel to the rotational axis of spring 108.

On the right side of device 100, anchor 106 has a row 122 of holes 124 (only one is labeled for clarity) located adjacent to the attachment location of anchor 106 to spring 110. Row 122 is parallel to the rotational axis of spring 110. Mirror 102 also has a row 126 of holes 128 (only one is labeled for clarity) located adjacent to the attachment location of mirror 102 to spring 110. Row 126 is also parallel to the rotational axis of spring 110.

Mirror 102 has a slot 130 near its upper perimeter and a slot 132 near its bottom perimeter. Slots 130 and 132 divide mirror 102 into a reflective region 134 and sacrificial portions 136 and 138. Each sacrificial portion can include alignment marks for the trimming process. When the material between two neighboring alignment marks is removed, then the natural frequency of the device changes by a known amount.

The natural frequency of device 100 can be reduced by increasing the lengths of springs 108 and 110. The natural frequency of device 100 can be increased by reducing the inertia of mirror 102. Thus, any combination of mirror 102, anchor 104, and anchor 106 can be trimmed to physically adjust the natural frequency of device 100.

Figure 2:
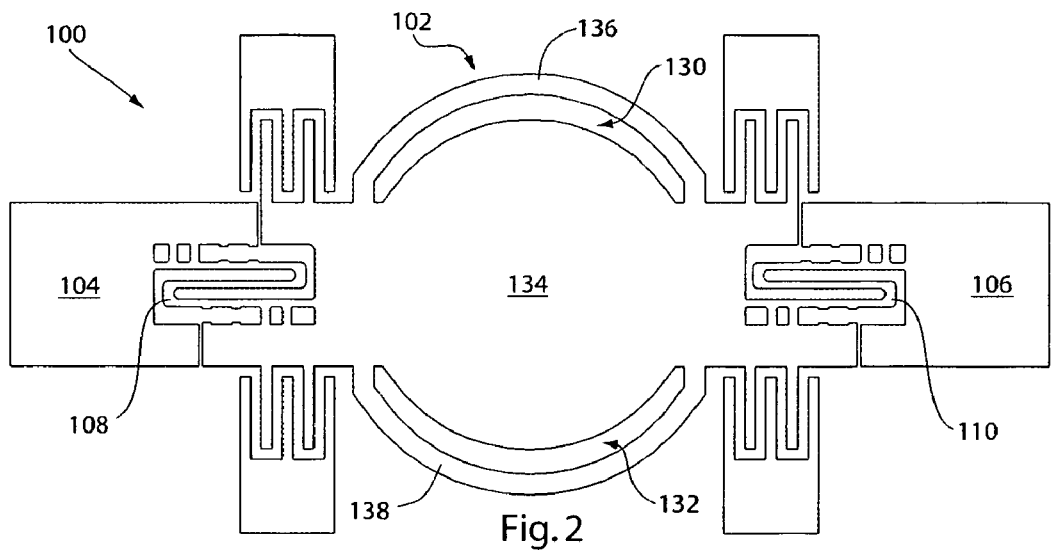
FIGS. 2 and 3 illustrate the MEMS mirror of FIG. 1 after trimming to fine tune the natural frequency of the mirror in one embodiment of the invention.

Referring to FIGS. 1 and 2, the lengths of springs 108 and 110 can be increased in multiple ways. Material 140 between the perimeter of anchor 104 and the outermost hole 114 in row 112 can be removed to lengthen spring 108. Material 142 between adjacent holes 114 in row 112 can be removed to further lengthen spring 108. Material 144 between the perimeter of mirror 102 and the outermost hole 118 in row 116 can be removed to length spring 108. Material 146 between adjacent holes 118 in row 116 can be removed to further lengthen spring 108.

Similarly, material 150 between the perimeter of anchor 106 and the outermost hole 124 in row 122 can be removed to lengthen spring 110. Material 152 between adjacent holes 124 in row 122 can be removed to further lengthen spring 110. Material 154 between the perimeter of mirror 102 and the outermost hole 128 in row 126 can be removed to length spring 110. Material 156 between adjacent holes 128 in row 126 can be removed to further lengthen spring 110. Materials from mirror 102 and anchors 104 and 106 can be removed by a laser beam or an ion beam.

Figure 3:
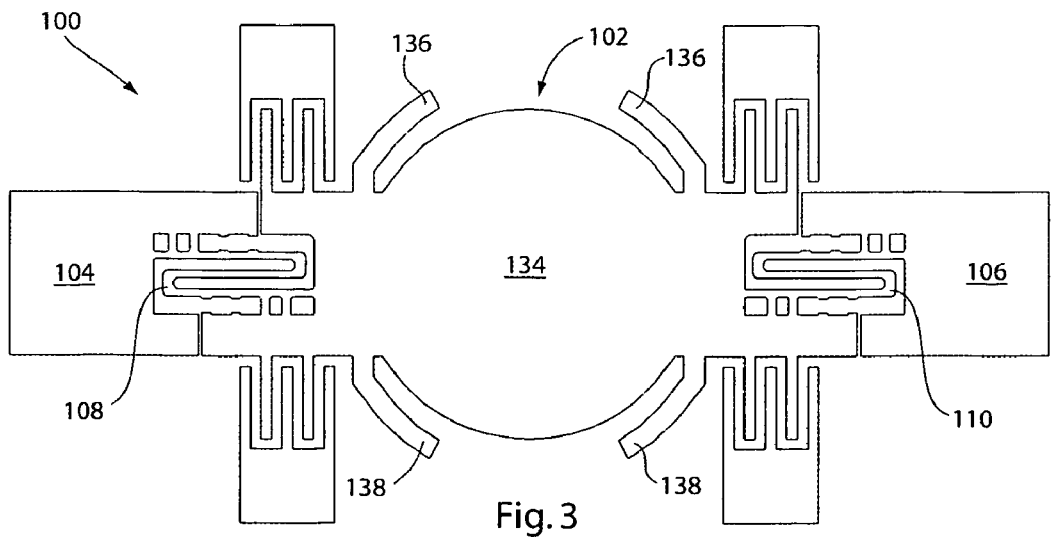

Referring to FIG. 3, the inertia of mirror 102 can be reduced by trimming sacrificial portions 136 and 138 of mirror 102. Sacrificial portions 136 and 138 can be trimmed by a laser beam or an ion beam. In one embodiment, each sacrificial portion can consist of two smaller individual pieces when a large range of adjustment is not necessary.

Figure 4:
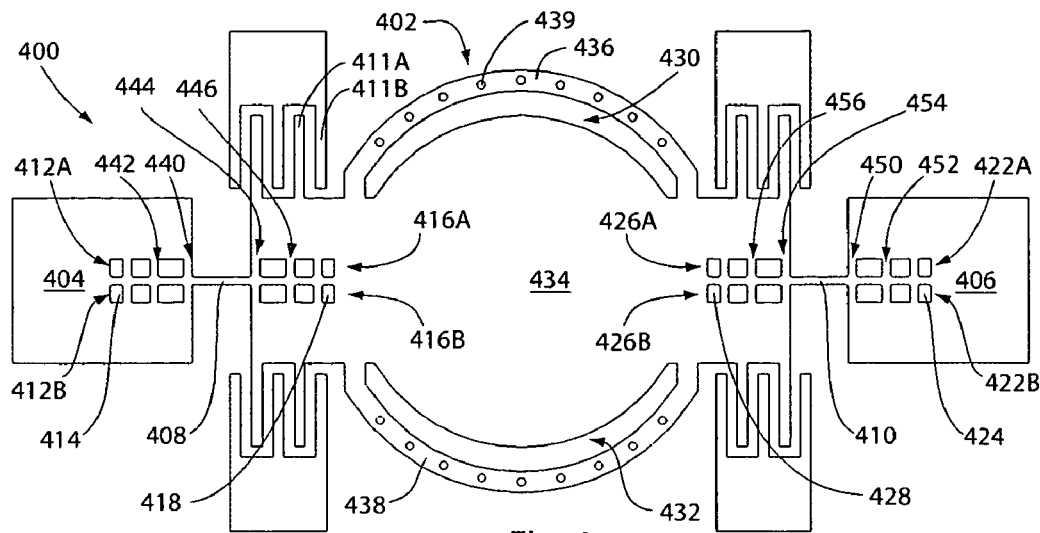
FIG. 4 illustrates a MEMS mirror prior to trimming in one embodiment of the invention.

FIG. 4 illustrates a MEMS mirror device 400 in one embodiment of the invention. Device 400 includes a mirror 402, anchors 404 and 406, a linear spring 408 coupling mirror 402 to anchor 404, and a linear spring 410 coupling mirror 402 to anchor 406. Typically anchors 404 and 406 suspend mirror 402 to allow mirror 402 to rotate along the rotational axis of springs 408 and 410. Mirror 402 include rotational fingers 411A that are interdigitated with in-plane or out-of-plane stationary fingers 411B. Rotational fingers 411A and stationary fingers 411B can be driven in a variety of fashion to oscillate mirror 102.

On the left side of device 400, anchor 404 has two rows 412A and 412B of holes 414 (only one is labeled for clarity) located adjacent to the attachment location of anchor 404 to spring 408. Rows 412A and 412B are parallel to the rotational axis of spring 408. Mirror 402 also has two rows 416A and 416B of holes 418 (only one is labeled for clarity) located adjacent to the attachment location of mirror 402 to spring 408. Rows 416A and 416B are also parallel to the rotational axis of spring 408.

On the right side of device 400, anchor 406 has two rows 422A and 422B of holes 424 (only one is labeled for clarity) located adjacent to the attachment location of anchor 406 to spring 410. Rows 422A and 422B are parallel to the rotational axis of spring 410. Mirror 402 also has two rows 426A and 426B of holes 428 (only one is labeled for clarity) located adjacent to the attachment location of mirror 402 to spring 410. Rows 426A and 426B are also parallel to the rotational axis of spring 410.

Mirror 402 has a slot 430 near its upper perimeter and a slot 432 near its bottom perimeter. Slots 430 and 432 divide mirror 402 into a reflective region 434 and sacrificial portions 436 and 438. Alternatively, each sacrificial portion can consist of two smaller individual pieces. Each sacrificial portion can include alignment marks 439 for the trimming process.

The natural frequency of device 400 can be reduced by increasing the lengths of springs 408 and 410. The natural frequency of device 400 can be increased by reducing the inertia of mirror 402. Thus, any combination of mirror 402, anchor 404, and anchor 406 can be trimmed to physically adjust the natural frequency of device 400.

Figure 5:
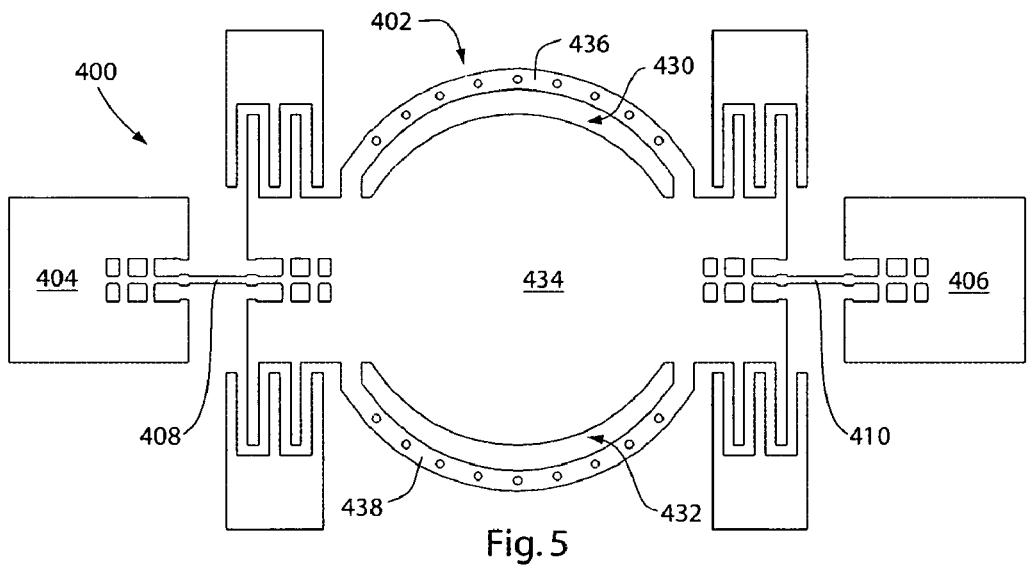
FIGS. 5 and 6 illustrate the MEMS mirror of FIG. 4 after trimming to fine tune the natural frequency of the mirror in one embodiment of the invention.

Referring to FIGS. 4 and 5, the lengths of springs 408 and 410 can be increased in multiple ways. Materials 440 between the perimeter of anchor 404 and the outermost holes 414 in rows 412A and 412B can be removed to lengthen spring 408. Materials 442 between adjacent holes 414 in each row can be removed to further lengthen spring 408. Materials 444 between the perimeter of mirror 402 and the outermost holes 418 in rows 416A and 416B can be removed to length spring 408. Materials 446 between adjacent holes 418 in each row can be removed to further lengthen spring 408.

Similarly, materials 450 between the perimeter of anchor 406 and the outermost holes 424 in rows 422A and 422B can be removed to lengthen spring 410. Materials 452 between adjacent holes 424 in each row can be removed to further lengthen spring 410. Materials 454 between the perimeter of mirror 402 and the outermost holes 428 in rows 426A and 426B can be removed to length spring 410. Materials 456 between adjacent holes 428 in each row can be removed to further lengthen spring 410. Material from mirror 402 and anchors 404 and 406 can be removed by a laser beam or an ion beam.

Figure 6:
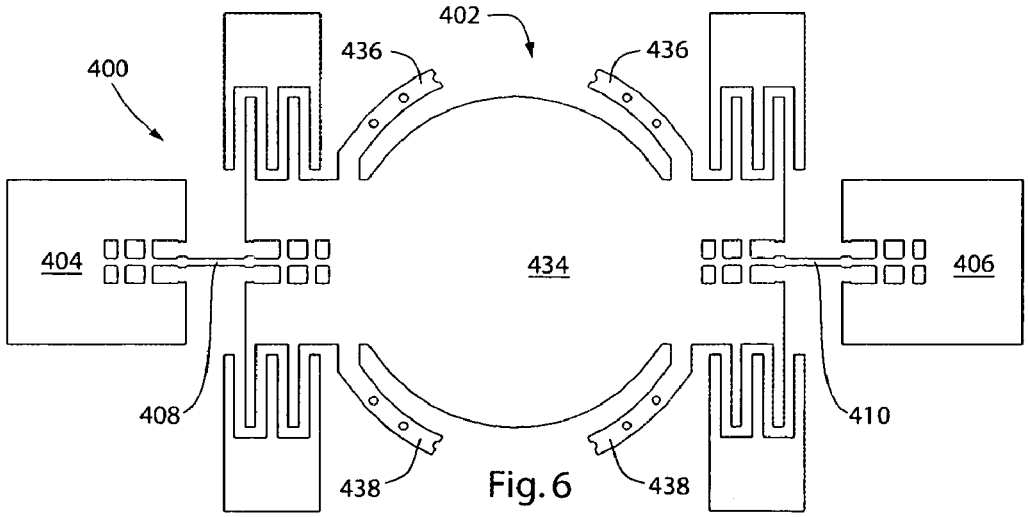

Referring to FIG. 6, the inertia of mirror 402 can be reduced by trimming sacrificial portions 436 and 438 of mirror 402. Sacrificial portions 436 and 438 can be trimmed by a laser beam or an ion beam. As described before, each sacrificial portion can consist of two smaller individual pieces when a large range of adjustment is not necessary. As described before, the natural frequency of the device changes by a known amount when the material between two neighboring alignment marks 439 is removed.

Figure 7:
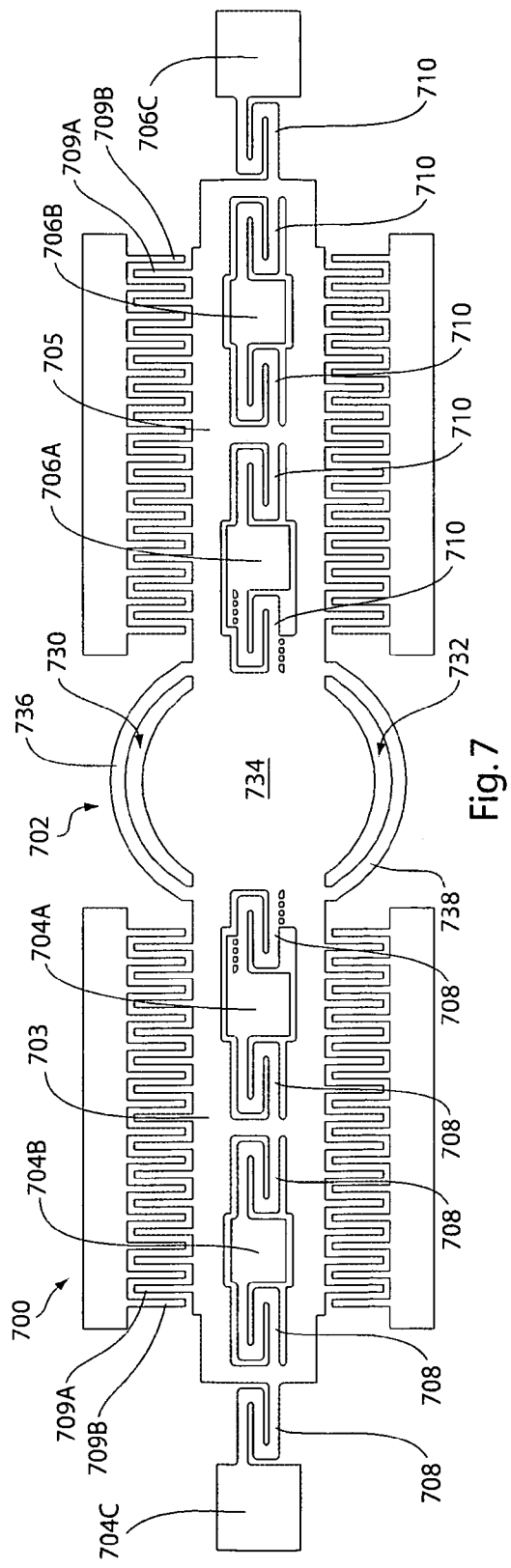
FIG. 7 illustrates a MEMS mirror prior to trimming in one embodiment of the invention.

FIG. 7 illustrates a MEMS mirror device 700 in one embodiment of the invention. A mirror 702 has beam structures 703 and 705 with rotational fingers 709A. Rotational fingers 709A are interdigitated with in-plane or out-of-plane stationary fingers 709B. The rotational and stationary fingers can be driven in a variety of fashion to oscillate mirror 702.

Anchors 704A and 704B are located within openings in beam structure 703. An anchor 704C is located at the end of beam structure 703. Serpentine springs 708 couple beam structure 703 to anchors 704A, 704B, and 704C. Anchors 706A and 706B are located within openings in beam structure 705. An anchor 706C is located at the end of beam structure 705. Serpentine springs 710 couple beam structure 705 to anchors 706A, 706B, and 706C. Typically anchors 704A, 704B, 704C, 706A, 706B, and 706C suspend mirror 702 to allow mirror 702 to rotate along the rotational axis of springs 708 and 710.

Mirror 702 has a slot 730 near its upper perimeter and a slot 732 near its bottom perimeter. Slots 730 and 732 divide mirror 702 into a reflective region 734 and sacrificial portions 736 and 738. Alternatively, each sacrificial portion can consist of two individual pieces extending from reflective region 734. Each sacrificial portion can include alignment marks for the trimming process.

The natural frequency of device 700 can be reduced by decoupling one or more of springs 708 and 710. The natural frequency of device 700 can be increased by reducing the inertia of mirror 702. Thus, any combination of mirror 702 and springs 708 and 710 can be trimmed to physically adjust the natural frequency of device 700.

Figure 8:
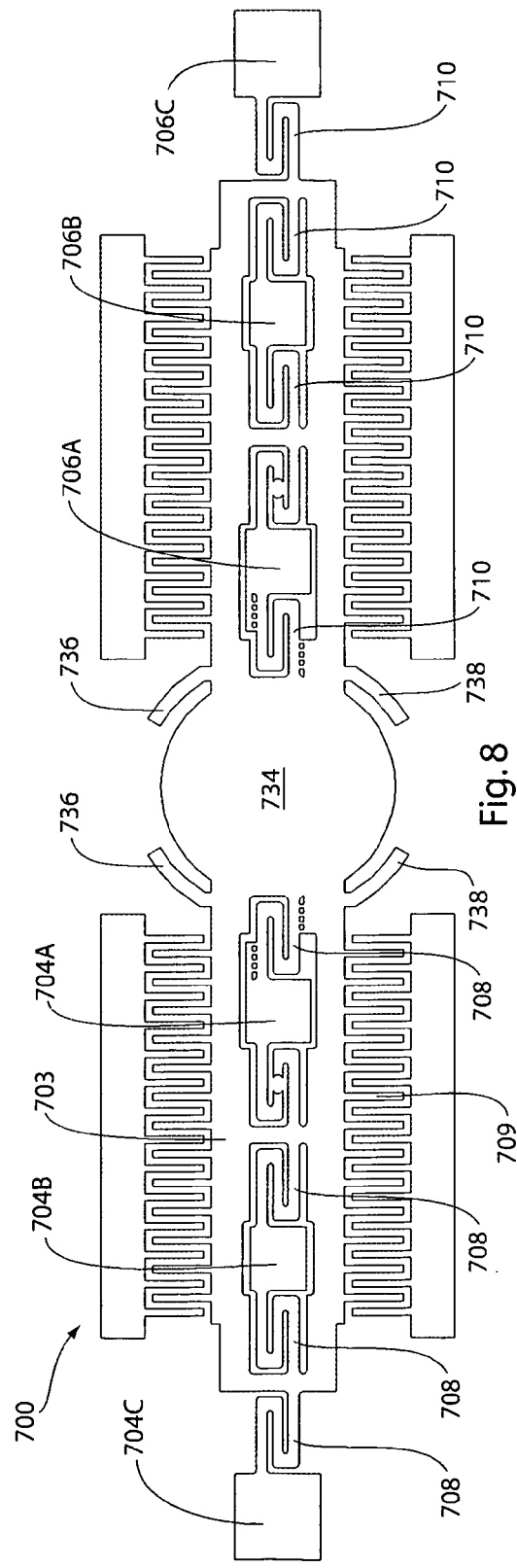
FIG. 8 illustrates the MEMS mirror of FIG. 7 after trimming to fine tune the natural frequency of the mirror in one embodiment of the invention.

Referring to FIG. 8, any of springs 708 and 710 can be decoupled. Springs 708 and 710 can be decoupled by severing the spring. Springs 708 and 710 can be severed by a laser beam or an ion beam. In addition, the previously described rows of holes can be placed adjacent to the mounting locations of springs 708 and 710 so that they can be connected to lengthen springs 708 and 710. The inertia of mirror 702 can be reduced by trimming sacrificial portions 736 and 738 of mirror 702. Sacrificial portions 736 and 738 can be trimmed by a laser beam or an ion beam. As described before, each sacrificial portion can consist of two smaller individual pieces when a large range of adjustment is not necessary. As described before, the natural frequency of the device changes by a known amount when the material between two neighboring alignment marks 439 is removed.

Various other adaptations and combinations of features of the embodiments disclosed are within the scope of the invention. For example, the design of the mirrors and the trimming/tuning method can be applied to electromagnetic scanning mirror, parallel plate electrostatic scanning mirror, thermally actuated scanning mirror, and piezoelectric scanning mirror. Numerous embodiments are encompassed by the following claims.

What is claimed is:

1. A mirror device, comprising:
   a mirror;
   a plurality of anchors;
   a plurality of springs coupling the mirror and the anchors;
   wherein one of the anchors defines a row of holes adjacent to a location where the one anchor is coupled to a respective one of the springs.

2. The device of claim 1, wherein the row of holes is arranged along a rotational axis of the one spring.

3. The device of claim 1, wherein the one anchor defines another row of holes adjacent to the location where the one anchor is coupled to the one spring.

4. The device of claim 1, wherein the one spring is selected from the group consisting of a liner spring and a serpentine spring.

5. The device of claim 1, wherein the mirror comprises a sacrificial portion that can be trimmed to adjust a natural frequency of the device.

6. The device of claim 5, wherein the sacrificial portion comprises alignment marks defining adjustment amounts to the natural frequency of the device.

7. The device of claim 5, wherein the mirror defines a slot near a perimeter of the mirror, the slot dividing the mirror into a reflective portion and the sacrificial portion.

8. The device of claim 1, wherein the mirror device comprises a micro-electro-mechanical system (MEMS) scanning mirror.

9. A mirror device, comprising:
   a mirror;
   a plurality of anchors;
   a plurality of springs coupling the mirror and the anchors;
   wherein the mirror defines a row of holes adjacent to a location where the mirror is coupled to one of the springs.

10. The device of claim 9, wherein the row of holes is arranged along a rotational axis of the one spring.

11. The device of claim 9, wherein the mirror defines another row of holes adjacent to the location where the mirror is coupled to the one spring.

12. The device of claim 9, wherein the one spring is selected from the group consisting of a linear spring and a serpentine spring.

13. The device of claim 9, wherein the mirror comprises a sacrificial portion that can be trimmed to adjust a natural frequency of the device.

14. The device of claim 13, wherein the sacrificial portion comprises alignment marks defining adjustment amounts to the natural frequency of the device.

15. The device of claim 13, wherein the mirror defines a slot near a perimeter of the mirror, the slot dividing the mirror into a reflective portion and the sacrificial portion.

16. The device of claim 9, wherein one of the anchors defines another row of holes adjacent to another location where the one anchor is coupled to a respective one of the springs.

17. The device of claim 9, wherein the mirror device comprises a micro-electro-mechanical system (MEMS) scanning mirror.

* * * * *

UNITED STATES PATENT AND TRADEMARK OFFICE
CERTIFICATE OF CORRECTION

PATENT NO. : 7,187,488 B2  Page 1 of 1
APPLICATION NO. : 11/077099
DATED : March 6, 2007
INVENTOR(S) : Yee-Chung Fu It is certified that error appears in the above-identified patent and that said Letters Patent is hereby corrected as shown below:

Column 5, line 27: Cancel "liner" and substitute --linear--.

Signed and Sealed this

Twenty-eighth Day of August, 2007

JON W. DUDAS
*Director of the United States Patent and Trademark Office*